US009355376B2

(12) United States Patent
Meyer et al.

(10) Patent No.: US 9,355,376 B2
(45) Date of Patent: May 31, 2016

(54) RULES LIBRARY FOR SALES PLAYBOOKS

(75) Inventors: Karen P. Meyer, Nashua, NH (US);
Michael W. Raitt, Methuen, MA (US);
John S. Gedaminski, Groton, MA (US);
Leo P. Steffens, Bedford, NH (US);
Mark A. Walling, Bedford, MA (US)

(73) Assignee: Qvidian, Inc., Chelmsford, MA (US)

( * ) Notice: Subject to any disclaimer, the term of this patent is extended or adjusted under 35 U.S.C. 154(b) by 0 days.

(21) Appl. No.: 13/470,039

(22) Filed: May 11, 2012

(65) Prior Publication Data

US 2013/0305173 A1    Nov. 14, 2013

(51) Int. Cl.
*G06Q 10/06* (2012.01)
*G06F 3/0481* (2013.01)
*G06Q 30/02* (2012.01)
*G06F 17/22* (2006.01)

(52) U.S. Cl.
CPC .............. *G06Q 10/06* (2013.01); *G06F 3/0481* (2013.01); *G06F 17/2229* (2013.01); *G06Q 30/0281* (2013.01)

(58) Field of Classification Search
CPC ... G06F 17/22; G06F 3/0483; G06F 17/2229; G06Q 30/0281
USPC .................................................. 715/747, 762
See application file for complete search history.

(56) References Cited

U.S. PATENT DOCUMENTS

| 5,309,355 A | 5/1994 | Lockwood |
| 5,815,566 A | 9/1998 | Ramot |
| 6,100,891 A * | 8/2000 | Thorne ................... H04M 3/51 379/267 |
| 6,269,355 B1 | 7/2001 | Grimse et al. |
| 6,701,322 B1 | 3/2004 | Green |
| 6,778,660 B2 | 8/2004 | Fromm |
| 6,850,924 B2 | 2/2005 | Grimse et al. |
| 6,963,826 B2 | 11/2005 | Hanaman et al. |

(Continued)

FOREIGN PATENT DOCUMENTS

| WO | WO/00/34910 | 6/2000 |
| WO | WO 0188752 A1 * | 11/2001 |

(Continued)

OTHER PUBLICATIONS

Sullivan, Mary. "Sales Playbooks Help Shorten the Sales Cycle." May 2010. [retrieved on Jan. 6, 2014] Retrieved from the Internet <URL: http://www.kickstartall.com/resources/archives/salesplaybook_may2010/>.*

(Continued)

*Primary Examiner* — Kieu Vu
*Assistant Examiner* — Blaine Basom
(74) *Attorney, Agent, or Firm* — Patent GC LLC

(57) ABSTRACT

Rules created in a computerized sales playbook system are stored in a rules library. Rules can be shared among playbooks, stages, plays, content and other playbook elements. Any playbook element can be associated with one or more rules. Such rules include one or more conditions that trigger the rule. If the conditions are met, then a playbook element is enabled for use by the user. Rules can be selected from the rules library as the playbook is being created. For example, when adding a play or a content item to a play, a user is prompted to add a rule to be associated with the playbook element. If the user adds a rule, an interface is presented allowing the user to select an existing rule from the rules library or create a new rule. If a new rule is created, it is added to the rules library.

21 Claims, 14 Drawing Sheets

(56) References Cited

U.S. PATENT DOCUMENTS

| | | | |
|---|---|---|---|
| 7,124,145 B2 * | 10/2006 | Surasinghe | |
| 7,213,209 B2 | 5/2007 | Lueckhoff | |
| 7,215,757 B2 | 5/2007 | Pennington, Jr. | |
| 7,424,440 B1 | 9/2008 | Gupta et al. | |
| 7,523,466 B2 | 4/2009 | DeAngelis | |
| 7,526,434 B2 | 4/2009 | Sharp | |
| 7,742,997 B1 | 6/2010 | Brenner | |
| 7,774,378 B2 | 8/2010 | Nelson | |
| 7,953,636 B2 | 5/2011 | Steuart | |
| 8,046,387 B2 | 10/2011 | Nelson | |
| 8,160,988 B1 | 4/2012 | Owen | |
| 8,185,429 B2 | 5/2012 | Howard | |
| 8,194,848 B2 | 6/2012 | Zernik | |
| 8,417,560 B2 | 4/2013 | Woods | |
| 8,452,640 B2 | 5/2013 | Kumar | |
| 8,531,501 B2 | 9/2013 | Portman | |
| 8,868,448 B2 | 10/2014 | Freishtat | |
| 9,081,866 B2 | 7/2015 | Coleman | |
| 2002/0133441 A1 | 9/2002 | Tanaka | |
| 2003/0144873 A1 | 7/2003 | Keshel | |
| 2003/0154120 A1 | 8/2003 | Freishtat | |
| 2004/0102995 A1 * | 5/2004 | Boppana | 705/1 |
| 2005/0004885 A1 | 1/2005 | Pandian | |
| 2005/0108082 A1 | 5/2005 | Jenkinson | |
| 2005/0278210 A1 | 12/2005 | Roberts et al. | |
| 2006/0253830 A1 | 11/2006 | Rajanala et al. | |
| 2006/0271913 A1 | 11/2006 | Erf | |
| 2007/0041567 A1 | 2/2007 | Anisimov | |
| 2007/0043609 A1 | 2/2007 | Imam et al. | |
| 2007/0061187 A1 | 3/2007 | Laskowski-Bender | |
| 2007/0088604 A1 | 4/2007 | Laskowski-Bender | |
| 2007/0094199 A1 | 4/2007 | Deshpande | |
| 2007/0124767 A1 | 5/2007 | Laskowski-Bender | |
| 2007/0239469 A1 | 10/2007 | Minnis et al. | |
| 2007/0294096 A1 | 12/2007 | Randall | |
| 2008/0222183 A1 | 9/2008 | Petri | |
| 2008/0270363 A1 | 10/2008 | Hunt et al. | |
| 2008/0279363 A1 | 11/2008 | Zernik | |
| 2008/0288889 A1 | 11/2008 | Hunt et al. | |
| 2008/0294996 A1 | 11/2008 | Hunt | |
| 2008/0319829 A1 | 12/2008 | Hunt et al. | |
| 2009/0006156 A1 | 1/2009 | Hunt et al. | |
| 2009/0012850 A1 | 1/2009 | Stretch et al. | |
| 2009/0018996 A1 | 1/2009 | Hunt et al. | |
| 2009/0063383 A1 | 3/2009 | Beaulieu | |
| 2009/0307074 A1 | 12/2009 | Sharma | |
| 2010/0010872 A1 * | 1/2010 | Drummond et al. | 705/10 |
| 2010/0083147 A1 | 4/2010 | Gaffney | |
| 2010/0169159 A1 | 7/2010 | Rose | |
| 2010/0287458 A1 | 11/2010 | Guller | |
| 2010/0292996 A1 | 11/2010 | Margrett | |
| 2011/0029339 A1 | 2/2011 | Callahan | |
| 2011/0256517 A1 | 10/2011 | Swanson | |
| 2012/0066175 A1 | 3/2012 | Pickering | |
| 2012/0102153 A1 | 4/2012 | Kemp | |
| 2012/0115114 A1 | 5/2012 | Daly et al. | |
| 2012/0130809 A1 | 5/2012 | Tedjamulia | |
| 2012/0290950 A1 | 11/2012 | Rapaport et al. | |
| 2013/0006711 A1 | 1/2013 | Biswas | |
| 2013/0110565 A1 | 5/2013 | Means, Jr. | |
| 2013/0179440 A1 * | 7/2013 | Gordon | 707/731 |
| 2013/0297368 A1 | 11/2013 | Meyer | |
| 2013/0325532 A1 | 12/2013 | Meyer | |
| 2013/0325548 A1 | 12/2013 | Kulkarni | |
| 2015/0356582 A1 | 12/2015 | Turner, Jr. | |

FOREIGN PATENT DOCUMENTS

| | | |
|---|---|---|
| WO | WO/01/99004 | 12/2001 |
| WO | WO/2005/088492 | 9/2005 |
| WO | WO/2008/092149 | 7/2008 |

OTHER PUBLICATIONS

Office Action in U.S. Appl. No. 13/462,504, mailed Feb. 14, 2013.
Office Action is U.S. Appl. No. 13/462,504, mailed Oct. 15, 2013.
Office Action in U.S. Appl. No. 13/486,306, mailed Jun. 5, 2015.
Office Action in U.S. Appl. No. 13/486,306, mailed Oct. 9, 2014.
Third Office Action in U.S. Appl. No. 13/486,306, mailed Feb. 26, 2016.

* cited by examiner

RULES — 1200

CREATE RULE — 1220

| Name | Type | Creator | Date Added | Description | Used by | Copy | Delete |
|---|---|---|---|---|---|---|---|
| Rule 1 | Type 1 | Name 1 | Date 1 | Description 1 | Elements 1 | + | x |
| Rule 2 | Type 2 | Name 2 | Date 2 | Description 2 | Elements 2 | + | x |
| Rule 3 | Type 3 | Name 3 | Date 3 | Description 3 | Elements 3 | + | x |
| Rule 4 | Type 4 | Name 4 | Date 4 | Description 4 | Elements 4 | + | x |
| Rule 5 | Type 5 | Name 5 | Date 5 | Description 5 | Elements 5 | + | x |
| Rule 6 | Type 6 | Name 6 | Date 6 | Description 6 | Elements 6 | + | x |
| Rule 7 | Type 7 | Name 7 | Date 7 | Description 7 | Elements 7 | + | x |
| Rule 8 | Type 8 | Name 8 | Date 8 | Description 8 | Elements 8 | + | x |
| Rule 9 | Type 9 | Name 9 | Date 9 | Description 9 | Elements 9 | + | x |

FIG. 12

RULES

| Name | Type | Creator | Date Added | Description | Used by | Copy | Delete |
|---|---|---|---|---|---|---|---|
| Rule 1 | Type 1 | Name 1 | Date 1 | Description 1 | Elements 1 | + | x |
| Rule 2 | Type 2 | Name 2 | Date 2 | Description 2 | Elements 2 | + | x |
| Rule 3 | Type 3 | Name 3 | Date 3 | Description 3 | Elements 3 | + | x |
| Rule 4 | Type 4 | Name 4 | Date 4 | Description 4 | Elements 4 | + | x |
| Rule 5 | Type 5 | Name 5 | Date 5 | Description 5 | Elements 5 | + | x |
| Rule 6 | Type 6 | Name 6 | Date 6 | Description 6 | Elements 6 | + | x |
| Rule 7 | Type 7 | Name 7 | Date 7 | Description 7 | Elements 7 | + | x |
| Rule 8 | Type 8 | Name 8 | Date 8 | Description 8 | Elements 8 | + | x |
| Rule 9 | Type 9 | Name 9 | Date 9 | Description 9 | Elements 9 | + | x |

CREATE RULE

Rule 9 – Where Used?
Playbook Element 1
Playbook Element 2
Playbook Element 3

FIG. 13

RULES LIBRARY FOR SALES PLAYBOOKS

BACKGROUND

For sophisticated sales processes, companies generally maintain computer systems that track a substantial amount of information about customers and potential customers. Such computer systems are commonly referred to as customer relationship management (CRM) systems.

Another tool that is commonly used in sophisticated sales processes is a sales playbook. A sales playbook defines a sequence of steps to be performed by a user, such as sales personnel, marketing personnel, customer support personnel and other users in an organization, when engaging a prospect. A sales playbook can be implemented on a computer, herein called a computerized sales playbook system. A sales playbook includes several playbook elements, some of which include instructions, content and the like to be used when engaging a prospect.

While some computerized sales playbook systems have access to data in a customer relationship management system, the data in the two computer systems generally are maintained through separate processes. In other words, one or more users update data in the CRM system, and separately one or more users update data in the computerized sales playbook system.

The steps of the sales process often are situational, in that they depend on the status of the prospect in the sales process. This situational nature can be expressed by a set of rules that determine, based on data about a prospect such as from a CRM system, whether a playbook, or action within a playbook, or specific content in the playbook, is provided to a user.

SUMMARY

Rules created in a computerized sales playbook system are stored in a rules library, allowing rules to be shared among playbooks, stages, plays and other playbook elements. In one implementation, a rule includes one or more conditions based on CRM data, an operator on the CRM data and a value. If the conditions of a rule are met, then a playbook, stage, play or other playbook element is enabled for use by the salesperson.

Rules can be selected from the rules library for a playbook element as the playbook is being created. For example, when adding a play or a content item to a play, a user can be prompted to add a rule to be associated with the playbook element. If the user chooses to add a rule, an interface is presented allowing the user to select an existing rule from the rules library or create a new rule. If a new rule is created, it can be added to the rules library. An existing rule can be edited to create a new rule, and such editing can include adding, deleting or modifying one or more conditions of the rule.

Providing a rules library enables rules to be managed as a distinct part of the sales process. Through various data analyses, the effectiveness of a rule or rules can be measured. When changes are made to a rule, the various playbook elements with which it is associated can be determined. This information can be used to ensure that the changes to the rule are appropriate for each instance in which the rule is used. Rules also can be categorized and filtered, to facilitate searching and comparison.

This Summary is intended to provide a brief introduction to concepts in a simplified form which are described further in the Detailed Description. This Summary is intended neither to identify any essential features of the claimed subject matter, nor to be used to limit the scope of the claimed subject matter.

BRIEF DESCRIPTION OF THE DRAWINGS

FIG. 12 illustrates an interface in an example implementation for presenting available rules.

FIG. 13 illustrates an interface in an example implementation for presenting where an available rule is used.

DETAILED DESCRIPTION

Figure 1:
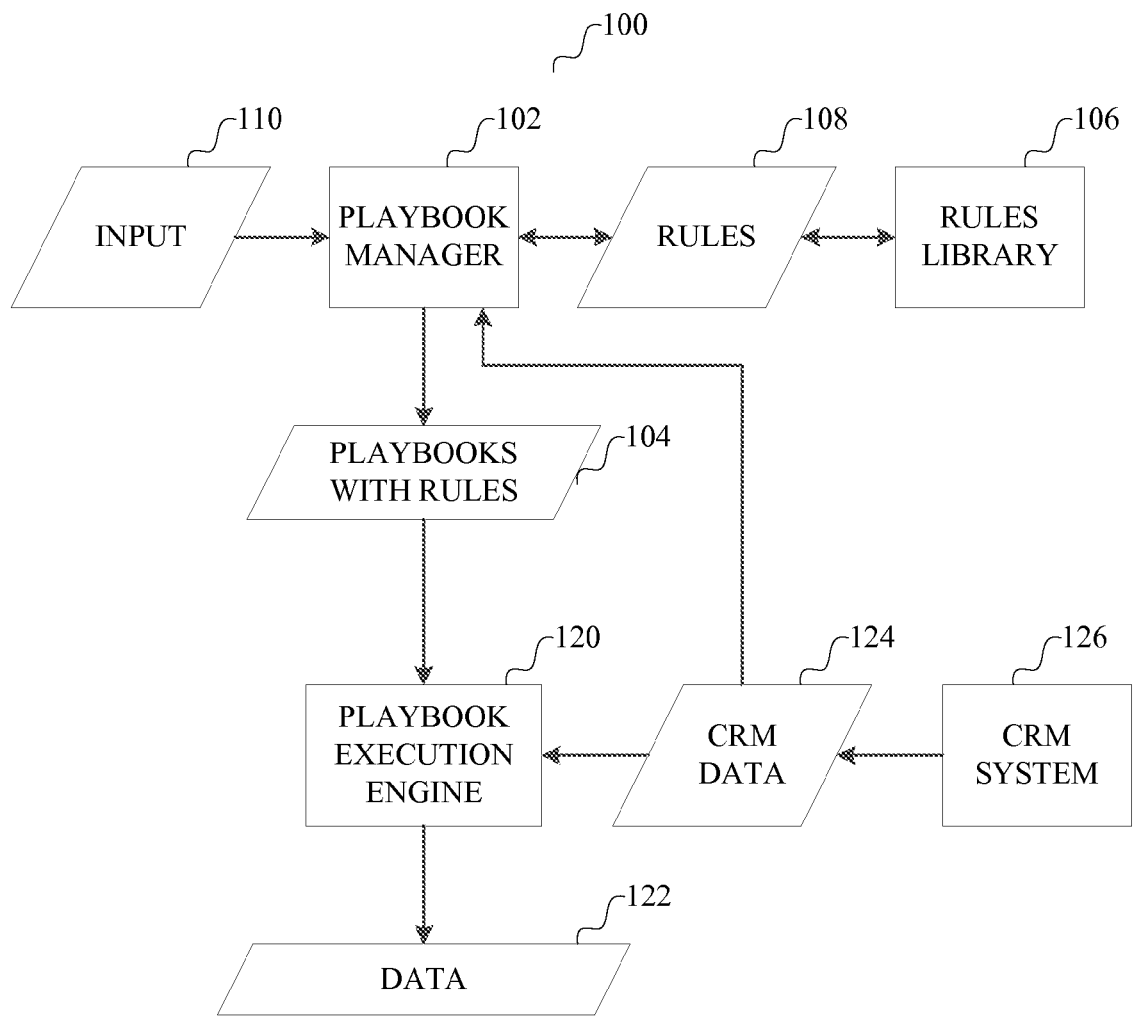
FIG. 1 is a block diagram of a computer system that supports a computerized sales playbook system with an associated rules library.

The following section describes an example implementation of a computerized sales playbook system with a rules library. Referring to FIG. 1, a computerized sales playbook system 100 includes a playbook manager 102 through which an individual can create sales playbooks 104, by providing user input 110. The sales playbook includes a plurality of playbook elements, such as plays and stages, which are a set of plays. A playbook element includes instructions, content, and the like to be used when engaging a prospect. Any playbook element, whether content, play, stage or entire playbook, can have one or more rules associated with it, indicating when the playbook element should be used. Also, one or more update rules may be associated with a playbook element, indicating what should occur when the playbook element is completed by a user. The use of update rules is described in more detail in co-pending U.S. patent application Ser. No. 13/462,504, filed May 2, 2012, entitled "Updating Customer Relationship Management Systems Through Sales Playbook Activities," with Karen P. Meyer, et al., as inventors, which is hereby incorporated by reference.

The sales playbooks are stored in computer readable storage. For example, playbooks, rules and the relationship between rules and playbooks can be stored as rows in a relational database. For example, one table can include rows that relate playbook elements with rules. Another table can include rows defining the playbook elements in a playbook, and the content used in each element. Another table can include rows defining elements of the rules. A variety of other implementations can be used to define playbooks, rules and their interrelationships and the invention is not limited to a specific implementation.

A rules library 106 provides rules 108 to the playbook manager 102; likewise, the playbook manager stores rules 108 in the rules library 106. In the playbook manager, through user input 110, rules 108 can be defined or selected by the user. In defining a rule, available CRM data 124 from a CRM system 126 can be accessed, to allow rules to be defined based on data stored in a CRM system.

A playbook execution engine 120 receives and processes sales playbooks 104 to provide data 122 to users throughout the marketing and sales process. The playbook execution system also has access to rules 108 and CRM data 124 from a CRM system 126.

When accessing sales playbooks, the rules 108 associated with elements of the playbooks, and CRM data 124 referenced by the rules, are accessed to determine which playbooks, plays, content and other playbook elements to make available to the sales personnel. In other words, the rules specify the conditions (based on CRM data) under which a playbook or play, or content associated with a play, is selected by the playbook execution engine. The playbook execution engine 120 has an input for receiving a sales playbook 104 from computer readable storage. It also has an output that presents playbook elements from the sales playbook to a user, such as by providing the data 122 to a display or to another computer. For example, data defining a sales playbook can be read from a database, and such data can be used to generate a document in a markup language, such as the eXtensible Markup Language (XML), which in turn can be sent to an application that renders the document for display.

Rules for sales playbooks can be used to control the playbook or playbooks to which users have access. For example, a sales representative focused on selling to small businesses may be presented with only a playbook that is geared for small businesses, while a sales representative focused on selling into very large businesses may be presented with only a playbook that is geared toward selling to that kind of customer. As another example, a sales representative may be limited in his authority regarding the verticals in which he is permitted to sell, which would limit the playbooks available to that sales representative.

Rules also can be used within a playbook to control a sequence of steps to be performed in connection with a prospect, and/or content to be presented to a prospect, based on various information. Such information can include data about the prospect, market conditions and business rules of the seller. For example, one vertical market for a product may have different competition and/or needs than another vertical market for that product, which can impact the content delivered by a sales representative when she addresses different prospects in the different vertical markets. As another example, the prospect may be a repeat customer, which can impact the content presented to that prospect.

Accordingly, the variety of specific rules that can be created is very large. However, rules in general are based on information known by the seller, which for the purposes of this document is presumed to be maintained in a customer relationship management (CRM) system. Clearly, a variety of systems can store relevant data on which rules can be based.

Rules are defined by a user, typically a sales manager, of the playbook manager 102 who has the authority in an organization to define playbooks and define rules implementing business rules defined by the organization. A state diagram of an example implementation of the playbook manager, described below in connection with FIG. 2 and associated interfaces, illustrates how such rules can be defined.

Figure 2:
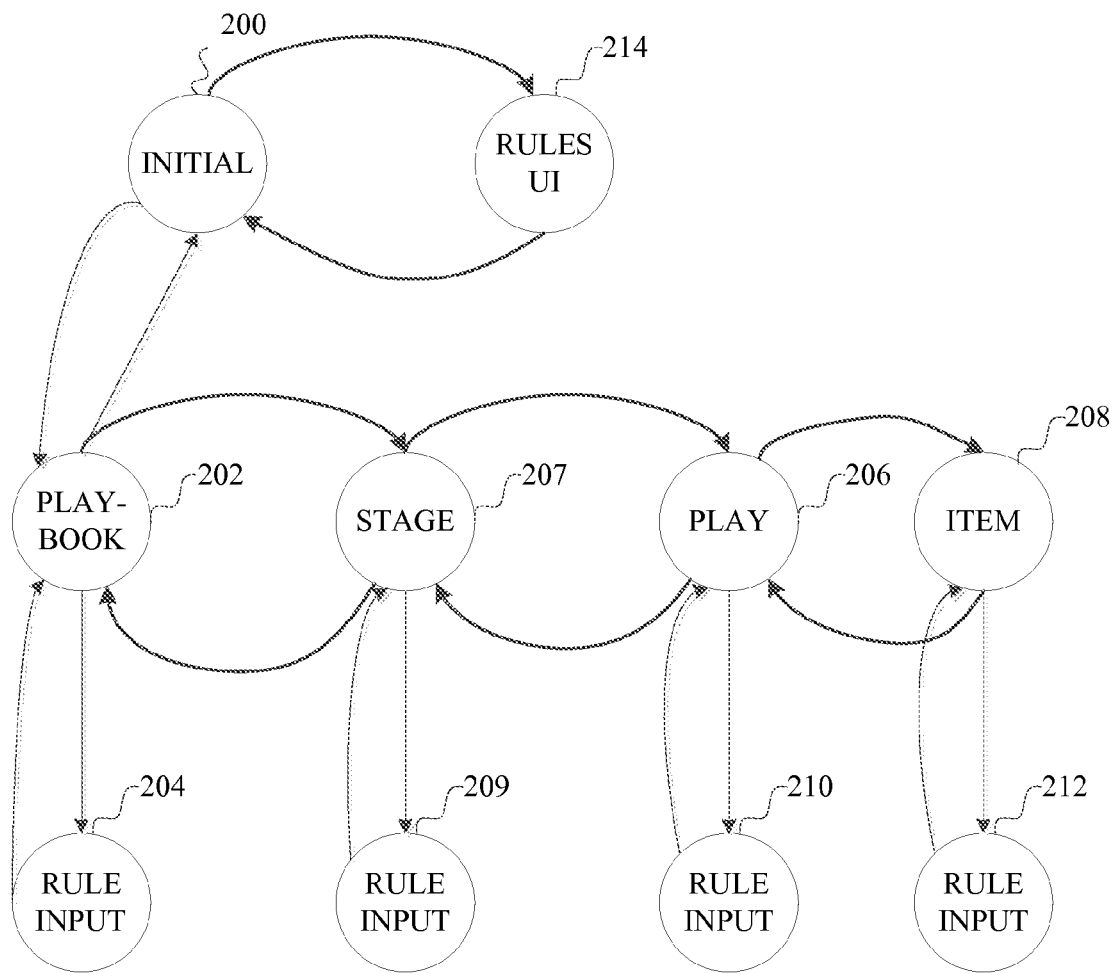
FIG. 2 is a state diagram of a playbook creation process for a computerized sales playbook system.

In FIG. 2, the playbook manager starts in an initial state 200. The initial state can include presentation of a user interface through which one or more existing playbooks can be presented for selection, and/or an option to create a new playbook can be presented. Additional states can be associated with additional interfaces through which user input can be provided. For example, upon selection of a playbook, or creation of a new playbook, a playbook state 202 can be entered. Various operations for editing the playbook continue to keep the system in playbook state 202. Upon completion, the system can transition back to the initial state 200.

In the playbook state, among a variety of other actions, a user can choose to associate a selection rule with the playbook, transitioning to state 204. In state 204, a user is presented with an interface to associate a selection rule with the playbook. See, as an example, FIGS. 3 and 4. Upon completion, the system can transition back to playbook state 202.

In the playbook state, among a variety of other actions, a user can choose to edit an existing play or stage or create a new play or stage, which causes a transition to play state 206 or stage state 207. In stage state 207, a user is presented an interface to edit or create a new stage (see FIG. 5). Editing operations on the stage continue to keep the system in a stage state 207. While in stage state 207, a user can choose to edit an existing play in the stage, which causes a transition to play state 206. In play state 206, a user is presented an interface to edit or create a new play (see FIG. 5). Editing operations on the play continue to keep the system in play state 206. Upon completion of editing or creating the play, the system can transition back to playbook state 202 or stage state 207.

While in the stage state 207, among a variety of other actions, a user can choose to associate a rule with the stage, transitioning to state 209. In state 209, a user is presented with an interface to associate a rule with the stage. Upon completion, the system can transition back to stage state 207.

While in the play state 206, among a variety of other actions, a user can choose to associate a rule with the play, transitioning to state 210. In state 210, a user is presented with an interface to associate a rule with the play. Upon completion, the system can transition back to play state 206.

While in the play state, a user may choose to add content to the play, transitioning to item state 208. In item state 208, a user is presented with an interface to edit or add an item of content to the play. Various editing operations related to the item of content keep the system in item state 208. Upon completion of editing or adding an item, the system can transition back to the play state 206.

While in the item state, among a variety of other actions, a user can choose to associate a rule with the item, transitioning to state 212. In state 212, a user is presented with an interface to associate a rule with the item. Upon completion, the system can transition back to item state 208.

In the initial state 200, a user also may select to view rules, in which case the playbook manager transitions to rule viewing state 214. When the user is done viewing rules (for example, by selecting another interface tab in the user interface), a transition back to the initial state 200 can occur.

Having now described a general overview of an example implementation of the playbook manager, example interfaces for input of rules will now be described.

Figure 3:
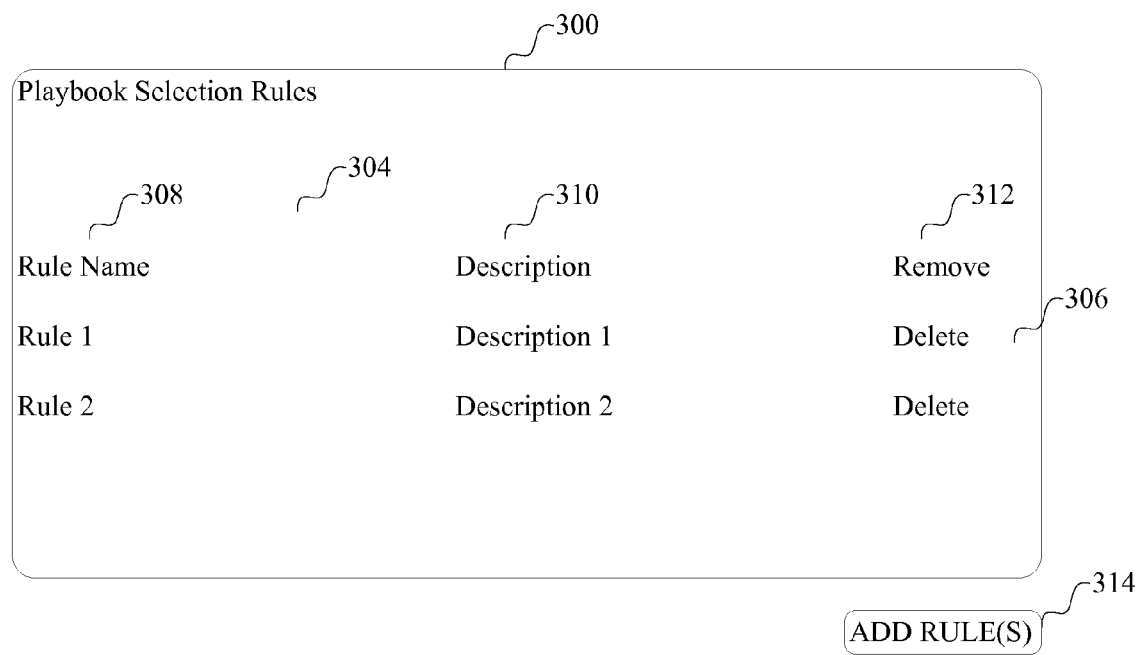
FIG. 3 illustrates an interface in an example implementation of the system of FIG. 2 for associating a rule with selection of a playbook.
Figure 4:
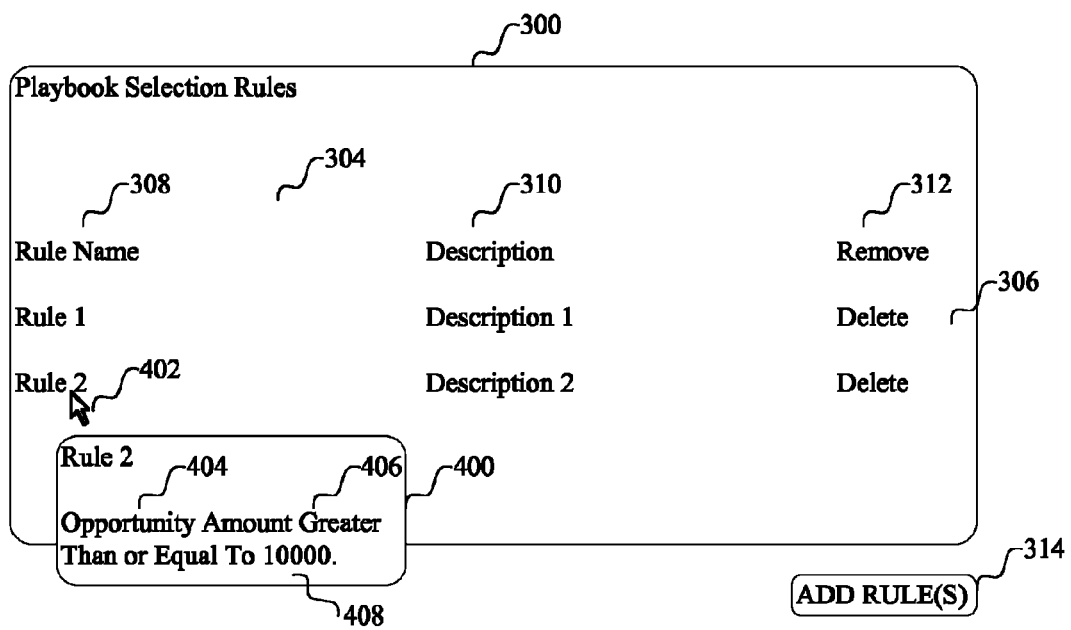
FIG. 4 illustrates an interface in an example implementation of the system of FIG. 2 for associating a rule with selection of a playbook.

Referring now to FIGS. 3 and 4, an example implementation of an interface for entry of playbook selection rules will now be described.

In FIG. 3, a playbook selection rule interface 300 is provided in response to a user selecting a "selection rules" tab 302. A variety of other mechanisms can be used to access the interface 300.

The rules interface 300 displays a list 304 of rules already associated with the playbook, with each rule displayed in its own row 306. The information about the rules can be displayed in several columns. In this example, a rule name 308 and a description 310 of the rules are displayed. A remove button 312 also is displayed which, upon selection by the user, allows the rule to be deleted from the list 304 if the rule is not used in any playbook element. In one implementation, a rule can be marked as available or unavailable for use.

An "add rule" button 314 also is displayed which, upon selection by the user, causes an interface for selecting an existing rule or defining a new rule to be displayed. An example of such an interface is described in more detail below in connection with FIGS. 7-9.

In FIG. 4, an additional feature of this interface is shown. In particular, at 400, an explanation of a rule can be displayed. This display can be activated, for example, by an appropriate user interface gesture related to the displayed name of the rule, such as causing a cursor 402 of a pointing device to hover over the name. To generate this display, the rules library is accessed to retrieve and process the rule definition into the displayed text. In this example, the name 404 of the CRM object field, an operator 406 and a value 408 are used to define a rule. These values are retrieved from the rules library and concatenated to provide the displayed text.

Figure 5:
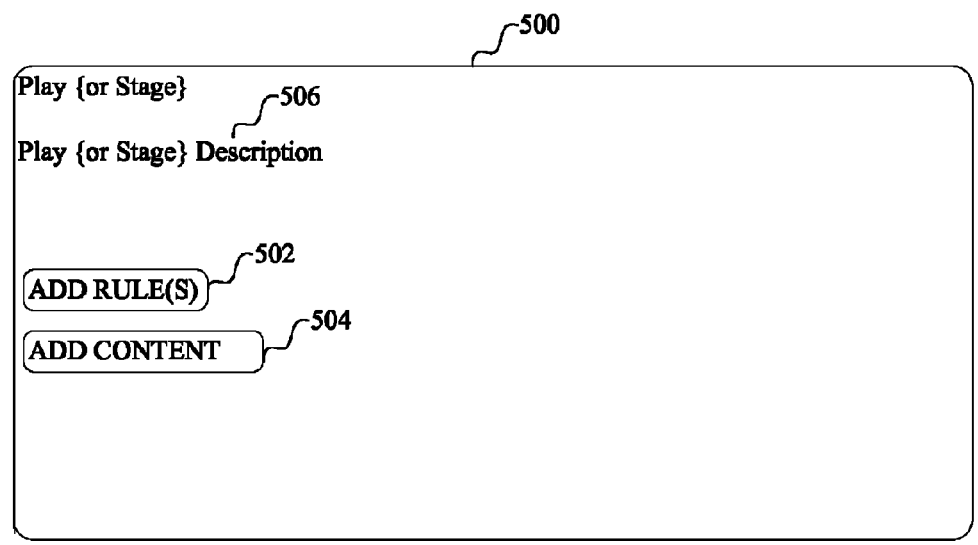
FIG. 5 illustrates an interface in an example implementation of the system of FIG. 2 for associating a rule with selection of a play.

In FIG. 5, an editing interface for a play or a stage is shown. In connection with displayed information 506 about a play or stage 500, a user interface object, in this case an "add rule" button 502, is displayed. Upon selection by the user, this button causes an interface for selecting an existing rule or defining a new rule to be displayed. An example of such an interface is described in more detail below in connection with FIGS. 7-9. An "add content" button 504 is present for the play editing interface and, when selected, causes an interface for adding content to a play to be displayed. An example of such an interface is described in more detail below in connection with FIG. 6.

Figure 6:
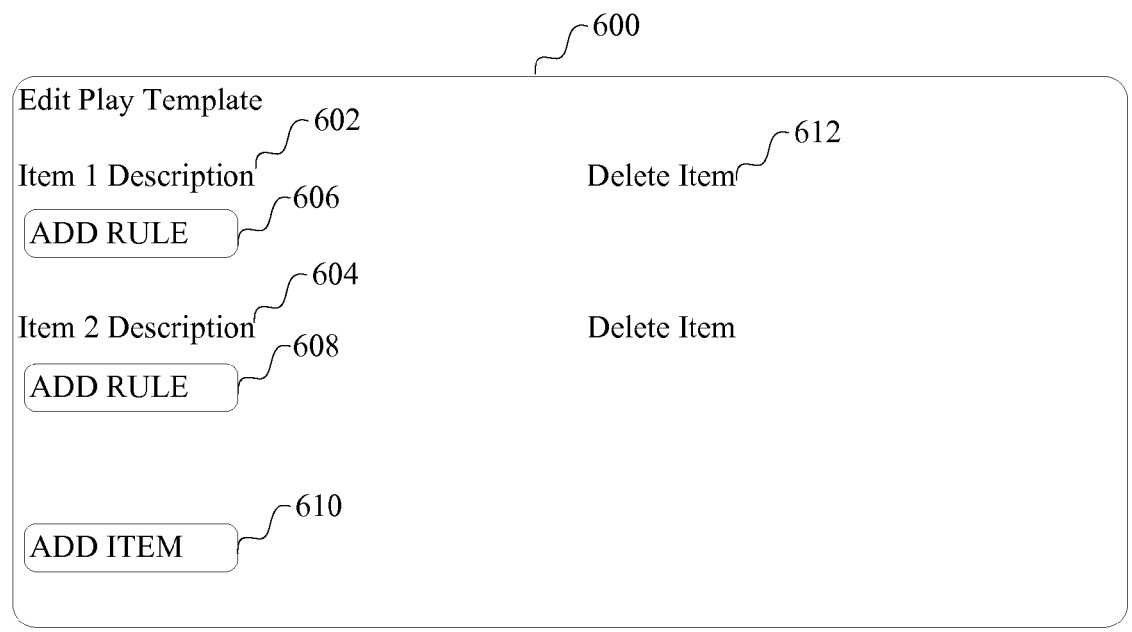
FIG. 6 illustrates an interface in an example implementation of the system of FIG. 2 for associating a rule with content for a play.

In FIG. 6, an interface 600 for adding content to a play is shown. For each item of content associated with a play, some information 602, 604 about the content is displayed, such as a file name, or text, or the like. In connection with displayed information about one or more items 602, 604, a user interface object, in this case an "add rule" button 606, 608, is displayed, one for each item. Upon selection by the user, this button causes an interface for selecting an existing rule or defining a new rule to be displayed. Items can be added to a play by selecting an "add item" button 610 and can be deleted by selecting a delete button 612. An example of an interface for selecting or defining rules is described in more detail below in connection with FIGS. 7-9.

Figures 7, 8:
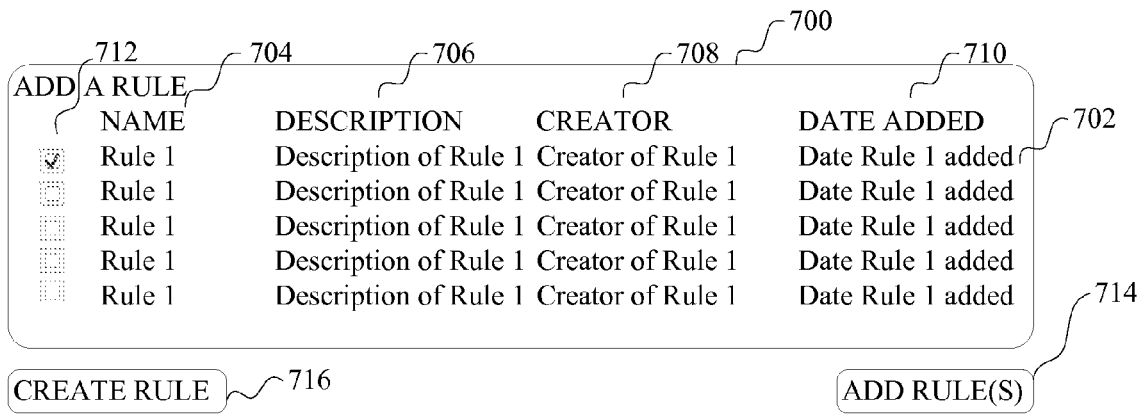
FIG. 7 illustrates an interface in an example implementation of the system of FIG. 2 for selecting an existing rule to be added to a playbook element.
FIG. 8 illustrates an interface in an example implementation of the system of FIG. 2 for defining a new rule to be added.

Referring now to FIG. 7, an example implementation of an interface for selecting an existing rule will now be described. This interface displays a list 700 if existing rules accessed from the rules library. Each row 702 of the list displays details about a rule. Each of the columns in the display provides different information about the rules. In this example implementation, there are columns to display a rule name 704, a rule description 706, a rule creator 708 and the date of creation of the rule 710. A checkbox 712, or other selection mechanism, is displayed adjacent a row. If a user would like to select a rule, the user manipulates the selection mechanism through an appropriate user interface gesture. In this case, a touch gesture or mouse click gesture can activate the checkbox 712 for a rule to select that rule. When the user has selected rules, the "add rules" button 714 can be activated, so as to add the selected rules to the playbook element that is currently active. If a new rule is to be created, the user activates the "create rule" button 716.

Upon activation of the create rule button 716 by the user, the system presents an interface to allow the user to specify a new rule, an example of which is shown in FIG. 8. In this interface, a user can specify a rule name 800, a rule description 802 and conditions that activate the rule. In this example interface, the conditions are defined in relation to CRM data. In particular, a user selects a type 804 of CRM data. Given the selected type, the system can access the API of the CRM system to identify the available fields of data stored for the selected CRM type. These fields are presented in a menu 806 labeled "CRM object". A user can select one of the presented fields. In addition, an operator applicable to that field can be selected through operator element 808. A value can be input through value interface 810. When a user has completed defining a condition as a combination of a CRM field, an operator, and a value (for example, by activating an "OK" button 812), the condition is stored as part of this rule.

Figure 9:
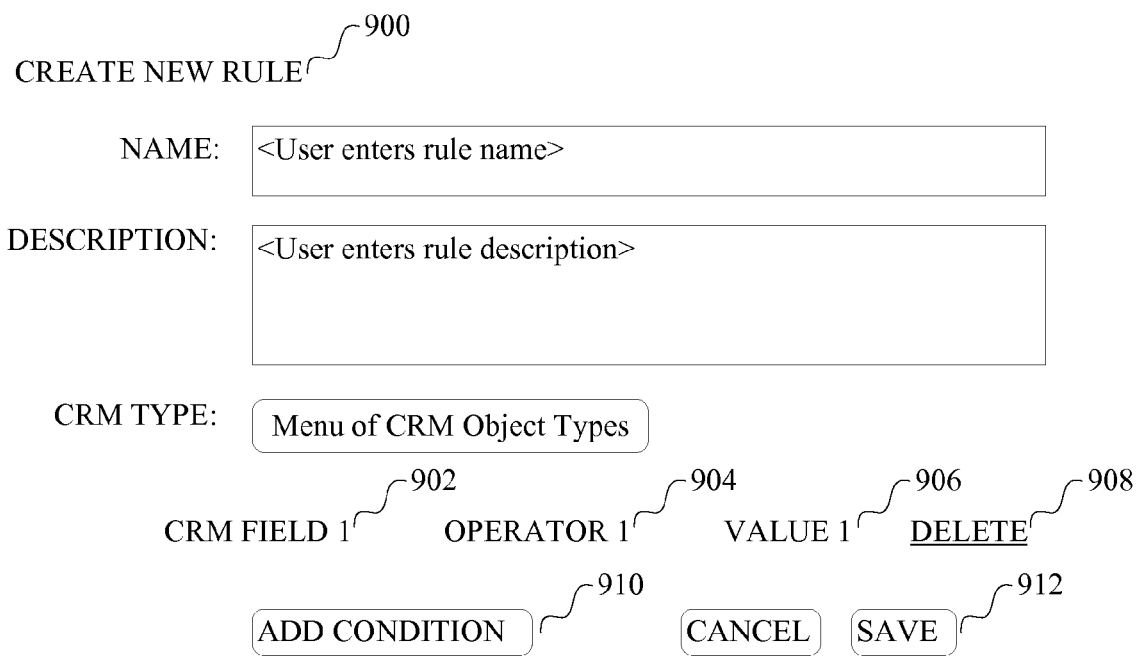
FIG. 9 illustrates an interface in an example implementation of the system of FIG. 2 for defining a new rule to be added.

In FIG. 9, after a condition is defined and stored, it is presented in the interface, such as shown at 900. The selected CRM field 902, operator 904 and value 906 are displayed. A selector (such as a delete condition button 908) is displayed that, when activated by the user, deletes the condition from the rule. An add condition button 910, when activated by the user, causes the condition definition interface (e.g., 806, 808 and 810 from FIG. 8) to be displayed again for entry of another condition. When a user activates a save button 912, the rule is saved to the rules library and is associated with the currently active playbook element.

Figure 10:
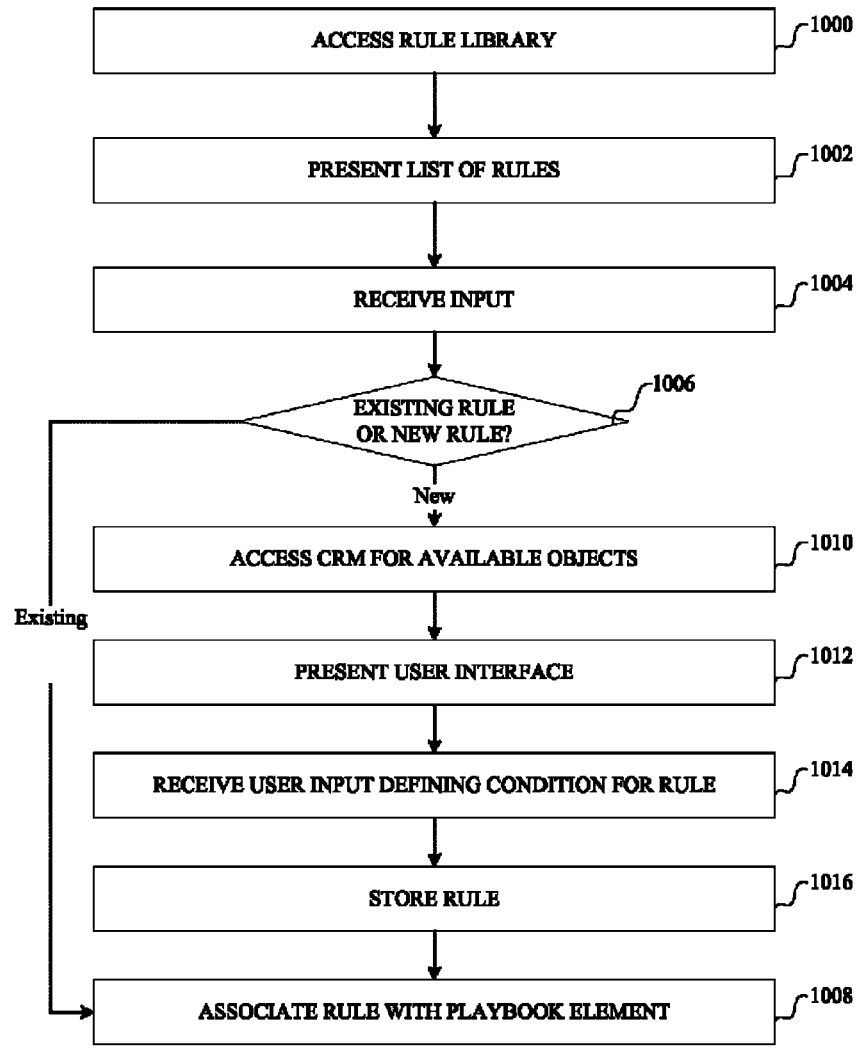
FIG. 10 is a flowchart describing an example implementation of creating a rule.

Having now described the interfaces through which rules are entered, a process for allowing a user to associate a rule with a playbook object will now be described in connection with the flow chart of FIG. 10.

The system first accesses 1000 the rule library to access data about available rules. Given the data about the rules, a list of available rules, such as in FIG. 7, is created and displayed 1002. User input is then received 1004, which is either a selection of an existing rule or an indication that a new rule is to be created, as determined at 1006. If the user input is the selection of an existing rule, then the rule is associated 1008 with the currently active playbook element.

If the user is adding a new rule, then the CRM system is accessed 1010 to identify available CRM objects and their fields. An interface is presented 1012 to the user to allow the user to provide input to define a condition for a rule, such as a CRM field, operator and value. The system receives 1014 the user input defining the condition for the rule. The condition can be verified, and any errors that are detected can be presented to the user. If the condition is verified, then it is added to the rule. The user can continue to input additional conditions for the rule. When the user has no more conditions to add, the rule can be stored 1016 and associated 1008 with the currently active playbook element. That playbook element can be an entire playbook, a play, an item in a play, a stage or any other playbook element. Further one or more rules can be associated with each kind of playbook element. The same interface of FIGS. 7-9 provides a uniform way in which these rules can be defined, regardless of the type of playbook element with which the rules are associated.

Having now described an example implementation of a playbook manager, more details about an example implementation of a rules library will now be described.

Figure 11:
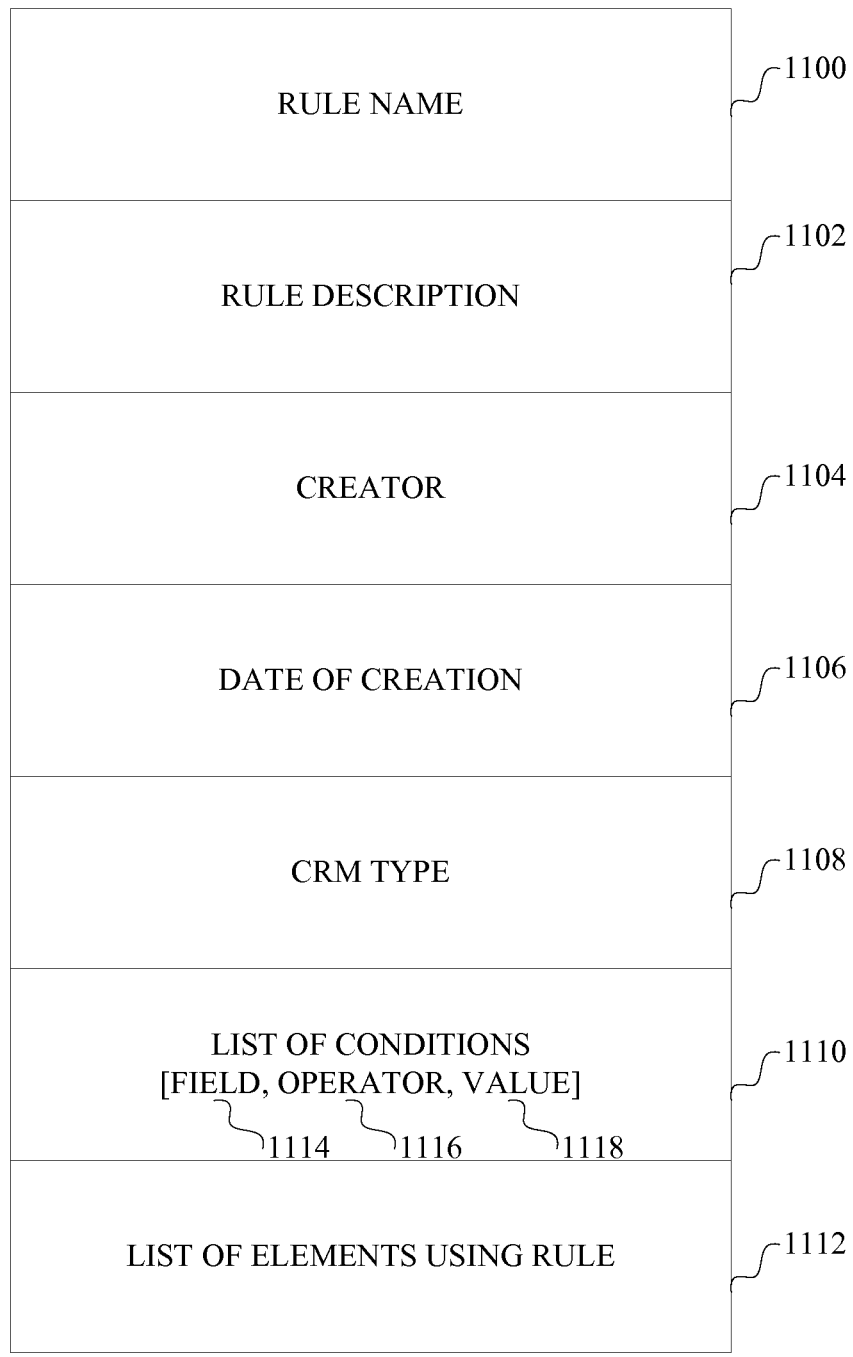
FIG. 11 is a diagram of an example data structure for storing information about a rule.

Referring to FIG. 11, the rules library stores each rule. As noted above, the data that is stored for a rule includes a rule name 1100, a rule description 1102, a creator 1104, a date of creation 1106, a CRM type 1108, a list 1110 of one or more conditions, and a list 1112 of one or more playbook elements with which it is associated. A condition is defined by a CRM field 1114, an operator 1116 and a value 1118. A playbook element is defined by an identifier for that element.

Referring to FIG. 12, an example interface for displaying this information is shown. A list 1200 of rules is presented, with each row 1202 presenting information about a rule. The columns in this example interface include the rule name 1204, the CRM type for the rule 1206. The creator 1208 and date added 1210 to the library also are presented. A description of the rule 1212 can provide more details about a rule to the user. A "used by" column 1214 indicates where the rule is used, i.e., which playbook elements are associated with the rule. In one example implementation, this information is represented by a count of the number of playbooks (which can be retrieved from the database (FIG. 11)), and a count of the number of plays, with which the rule is associated. The display in FIG. 12 also can include operations associated with each rule, such as copy and/or delete as indicated at 1216. A "create new rule" button also can be provided (at 1220) to activate an interface (such as shown in FIGS. 8 and 9) to allow a user to create a new rule. If other data, such as categories or keywords, are associated with rules, then rules also can be categorized, filtered, searched and compared more easily by users, and facilitate management of the rules in the rules library.

In FIG. 13, an example interface shows where a rule is used. The interface can be activated using any of a number of user interface gestures, such as a mouse click, mouse hover event (placing a pointer 1302 over the row and column), a touch on a touch sensitive device, or the like. When the interface 1300 is activated, the information about where a rule is used is accessed from the rules library. This information is processed and formatted for display, for example with a row for each play, stage, playbook or other playbook element in which the rule is used. Each row in the interface 1300 is populated, in this example, with the names of playbook elements that are using the rule as a selection rule. Plays can be displayed first in the list, then playbooks, then other playbook elements. Selecting a playbook element from the interface 1300 can be used to filter the list 1200 to show only those rules that are used in the selected playbook element as a selection rule. Alternatively, selecting a playbook element from the list 1300 can cause the system to display more information about that playbook element. Thus, when changes are made to a rule, the various playbook elements with which it is associated can be determined. This information can be used to ensure that the changes to the rule are appropriate for each instance in which the rule is used.

Figure 14:
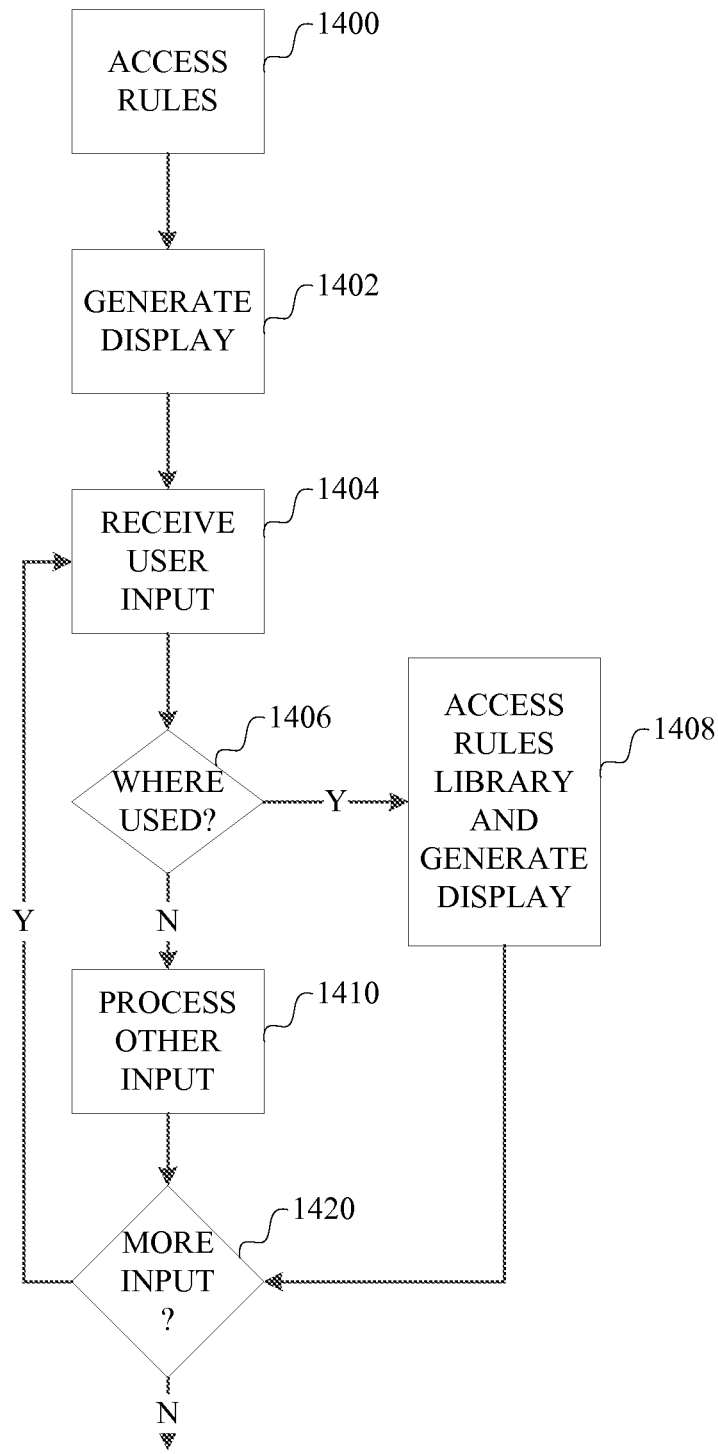
FIG. 14 is a flowchart describing an example implementation of generating an interface presenting the available rules.

A flowchart describing how to generate the display of FIGS. 12 and 13 will now be described in connection with FIG. 14. The rules database is accessed 1400 to identify the available rules. The data for each rule is extracted and processed to generate 1402 the display. For example, the display can be organized into an array of rule data that can be sorted on each field, with the fields corresponding to the display columns of the interface (such as FIG. 12). User input (such as selection of a column for sorting) is then received 1404. If the user input is a selection of where a rule is used, as determined at 1406, then the database is accessed 1408 to identify information about the playbooks and plays where the rule is used, to present the interface shown in FIG. 13. Otherwise, the system continues to process 1410 input, and can update the display accordingly. If more input is provided, as determined at 1420, the system continues to process the input, until the user otherwise exits the interface.

Having now described an example implementation of a rules library for a computerized sales playbook system, a computing environment for supporting such a system will now be described. Such a computing environment can include numerous general purpose or special purpose computing hardware configurations. Examples of well known computing devices, which can be microprocessor-based systems or multiprocessor systems for example, include, but are not limited to, personal computers, server computers, hand-held computing devices (for example, media players, cellular phones, personal data assistants, voice recorders), laptop computers, notebook computers, set top boxes, game consoles, programmable consumer electronics, network computers, minicomputers, mainframe computers, distributed computing environments that include any of the above devices, and the like.

Figure 15:
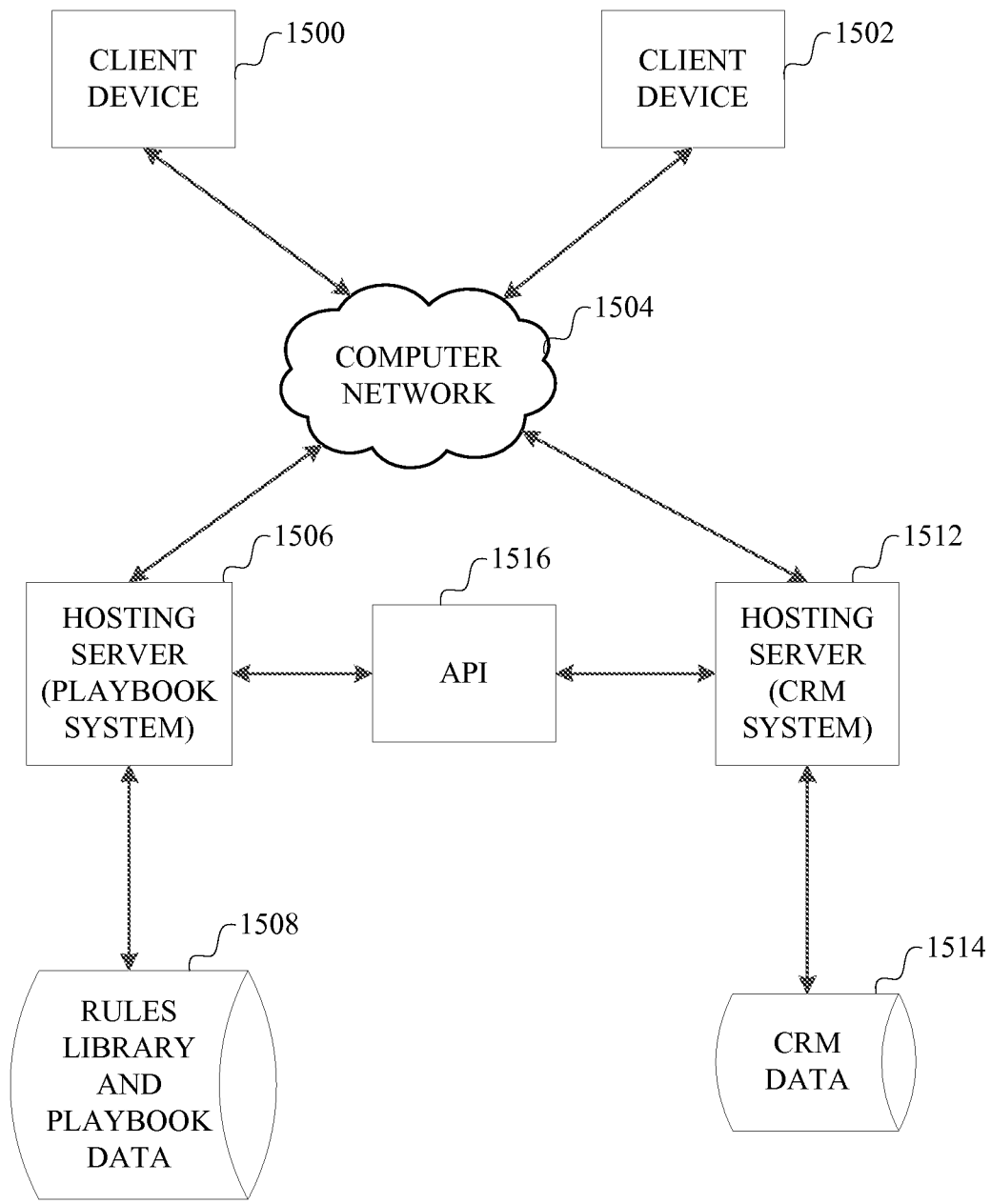
FIG. 15 is a block diagram of a distributed, remote access computer system supporting such a computerized sales playbook system.

FIG. 15 illustrates an example of a networked computing system environment for implementing this rules library system. This is only one example of such an implementation. Other implementations are possible. The rules library system also can be implemented using computing environments that are not distributed, such as a single computing machine.

In FIG. 15, client devices 1500 and 1502 connect to a computer network 1504, such as the internet. A client device can be, for example, a typical personal computer, laptop computer, notebook computer, tablet device, mobile phone or smartphone, with a variety of possible input devices and output devices.

A hosting server 1506 for the computerized playbook system is connected to the computer network 1504. The hosting server accesses a database 1508 that stores the rules library and playbook data. The rules library and playbook data may be stored in two separate schemas in the database 1508. A user accesses the hosting server through a host application (not shown), such as an internet browser, running on the client device. After logging in by providing appropriate credentials, a user is provided various interfaces by the hosting server for accessing the playbook data and rules, such as the interfaces described above.

Similarly, a hosting server 1512 for a customer relationship management (CRM) system is connected to the computer network 1504. This hosting server accesses a database 1514 that stores CRM data. A user also accesses this hosting server through a host application (not shown), such as an internet browser, running on the client device.

An application programming interface (API) 1516 can connect the hosting server for playbook system to the hosting server for the CRM system. This API can be used (as described above) to allow the playbook system to access CRM data for use in the sales playbook system, such as for creating content, defining rules and the like. Other programs, such as those that implement data analyses, can be added to the system to enable users to measure the effectiveness of rules.

An example computing machine that can be used in such a networked environment to implement all or part of this rules library system will now be described. A computing machine typically includes at least one processing unit and memory.

The computing machine may include multiple processing units and/or additional co-processing units, such as a graphics processing unit (GPU). Memory may be volatile (such as RAM), non-volatile (such as ROM, flash memory, etc.) or some combination of the two. A computing machine may include persistent storage, which can be removable or non-removable, example of which include, but are not limited to, magnetic or optical disks or tape.

Computer storage media includes volatile and nonvolatile, removable and non-removable media implemented in any method or technology for storage of information such as computer program instructions, data structures, program modules or other data. Memory removable storage and non-removable storage are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by a computing machine. Any such computer storage media may be part of the computing machine.

A computing machine also may have communications connection(s) that allow the computing machine to communicate with other devices over communication media. Communication media typically transmits computer program instructions, data structures, program modules or other data between storage in one device to storage in another device. By way of example, and not limitation, communication media includes wired media such as a wired network or direct-wired connection, and wireless media such as acoustic, RF, infrared and other wireless media.

A computing machine also has one or more input devices. Example input devices include but are not limited to, a keyboard, mouse, touch input device, camera, and so on. A computing machine also has one or more output devices. Example output devices include, but are not limited to, a display, speakers, a printer, and so on. Such devices are well known in the art and are therefore not discussed at length here.

The rules library is generally implemented in such an environment using computer programs, which include computer-executable instructions and/or computer-interpreted instructions, such as program modules, being processed by a computing machine. Generally, program modules include routines, programs, objects, components, data structures, and so on, that, when processed by a processing unit, instruct the processing unit to manipulate data in memory to implement data structures, or to process data into another form or representation according to defined operations. Such instructions generally are stored in and read from computer readable storage media by a processing unit.

It should be understood that the subject matter defined in the appended claims is not limited to the specific implementations described above. The specific implementations described above are presented as examples only.

What is claimed is:

1. A computer system comprising:
    at least one computer executing stored instructions that, when executed by the at least one computer, configure the at least one computer to include:
    storage configured to store a rules library comprising a plurality of rules, each rule in the plurality of rules comprising: a. at least one condition based on one or more fields of customer relationship management data from a customer relationship management system and b. an indication of an action, the action being selected from a group comprising: selection of a playbook element to be displayed, and update of customer relationship management data from the customer relationship management system performed upon completion of a playbook element;
    a playbook manager configured to define, in response to inputs from at least one first user, a playbook comprising a plurality of playbook elements, one or more of the playbook elements including content to be provided over a computer network to a prospect;
    the playbook manager further comprising:
        an interface configured to query the customer relationship management system for available fields used for the customer relationship management data;
        a rules editing interface through which the playbook manager is configured to receive inputs from the at least one first user, the inputs including selection from among the available fields for use in rules, conditions for the rules and actions for the rules;
        the playbook manager being further configured to define, in response to the inputs, the rules as specified by the inputs, and to store the defined rules in the rules library;
    the playbook manager further comprising a rules selection interface through which the playbook manager is configured to receive inputs from the at least one first user comprising an indication of a selection of one or more rules of a plurality of displayed rules from the rules library and an indication of a selection of a playbook element of a selected sales playbook, the playbook manager being further configured to associate the selected one or more rules with the selected playbook element of the selected sales playbook; and
    a playbook execution engine comprising inputs configured to interactively receive customer relationship management data for a prospect from the customer relationship management system and a sales playbook comprising playbook elements and rules from the rules library associated with the playbook elements,
    the playbook execution engine being further configured:
        to interactively process the sales playbook according to the rules associated with the playbook elements of the sales playbook and the received customer relationship data and inputs from at least one second user different from the at least one first user,
        to interactively select playbook elements for presentation to the at least one second user,
        in response to an instruction from the at least one second user, to cause any content associated with a playbook element to be provided over a computer network to the prospect, and
        to interactively update the customer relationship management data in the customer relationship management system, through an interface configured to process updates to the customer relationship management data, in response to actions by the at least one second user with respect to the selected playbook elements.

2. The computer system of claim 1, wherein the rules associated with the playbook elements by the first user defines a sequence of steps to be performed by the second user when the second user interacts with the playbook elements through the playbook execution engine.

3. The computer system of claim 1, wherein the conditions for the rules are defined as references to the available fields of the customer relationship management data in the customer relationship management system, an operator and a value.

4. The computer system of claim 3, wherein the rules editing interface includes, to edit a condition:
an interface for selecting an object accessed from the customer relationship management system, the object including an available field,
an interface for selecting an operator, and
an interface for selecting one or more values to define the condition.

5. The computer system of claim 1, wherein the plurality of playbook elements comprises a play as a kind of playbook element, wherein a play comprises content.

6. The computer system of claim 5, wherein the plurality of playbook elements comprises content of a playbook element as a kind of playbook element.

7. The computer system of claim 6, wherein the plurality of playbook elements comprises a stage as a kind of playbook element, wherein a stage comprises a plurality of plays.

8. The computer system of claim 7, wherein the plurality of playbook elements comprises a playbook as a kind of playbook element, wherein a playbook comprises a plurality of stages.

9. The computer system of claim 8, wherein an action of a rule indicating selection of a playbook element to be displayed is one of: selection of content for a play, selection of a play, selection of a stage and selection of a playbook.

10. The computer system of claim 1, wherein the rules selection interface displays, for a selected displayed rule, playbook elements of playbooks which use the selected displayed rule.

11. The computer system of claim 1, wherein the rules selection interface displays, for each rule of the displayed rules, a type of object from the customer relationship management system used by the rule and a description of the rule.

12. The computer system of claim 1, wherein the playbook manager displays a user interface object for each item of content associated with a playbook element,
wherein the playbook manager, in response to user input with respect to the user interface object for an item of content, is configured to activate the rules selection interface with respect to the item of content to associate a rule with the item of content.

13. A process performed by a computing machine, comprising:
employing at least one computer executing stored instructions that, when executed by the at least one computer, configure the at least one computer to perform:
storing rules in a rules library comprising a plurality of rules, each rule in the plurality of rules comprising: a. at least one condition based on one or more fields of customer relationship management data from a customer relationship management system and b. an indication of an action, the action being selected from a group comprising: a selection of a playbook element to be displayed and update of customer relationship management data from the customer relationship management system performed upon completion of a playbook element;
providing a rules editing interface through which a playbook manager receives inputs from at least one first user, the playbook manager including an interface configured to query the customer relationship management system for available fields used for the customer relationship management data, the available fields being presented in the rules editing interface, wherein the inputs to the rules editing interface includes selection from among the available fields for use in rules, conditions for the rules and actions for the rules, wherein the playbook manager is configured to define one or more rules based at least on the inputs from the rules editing interface and to store the one or more defined rules in the rules library;
providing a rules selection interface enabling the playbook manager to receive inputs from the at least one first user for editing a playbook, said playbook comprising a plurality of playbook elements, one or more of the playbook elements including content to be provided over a computer network to a prospect, the rules selection interface receiving an indication of a selection of one or more rules of a plurality of displayed rules from the rules library and an indication of a selection of a playbook element of a selected sales playbook, and associating the selected one or more rules with the selected playbook elements; and
a playbook execution engine interactively receiving data for a prospect from the customer relationship management data from a customer relationship management system, and a selected sales playbook comprising playbook elements and rules from the rules library associated with the playbook elements of the selected sales playbook,
the playbook execution engine interactively processing the sales playbook according to the rules associated with the playbook elements of the selected playbook and the received customer relationship data and inputs from at least one second user different from the at least one first user, to:
interactively select playbook elements for presentation to the at least one second user,
in response to an instruction from the at least one second user, cause any content associated with a playbook element to be provided over a computer network to the prospect, and
interactively update the customer relationship management data in the customer relationship management system, through an interface configured to process updates to the customer relationship management data, in response to actions by the at least one second user with respect to the selected playbook elements.

14. The process of claim 13, wherein the rules associated with the playbook elements by the first user defines a sequence of steps to be performed by the second user when the second user interacts with the playbook elements through the playbook execution engine.

15. The process of claim 13, wherein the conditions for the rules are defined as a reference to a field of the available fields of the customer relationship management data in the customer relationship management system, an operator and a value.

16. The process of claim 15, wherein the rules editing interface includes, to edit a condition:
an interface for selecting an object accessed from the customer relationship management system, the object including an available field,
an interface for selecting an operator, and
an interface for selecting one or more values to define the condition.

17. The process of claim 13, wherein the plurality of playbook elements comprises a plurality of kinds of playbook elements, where the plurality of kinds of playbook elements comprises:
(a) a playbook,
(b) a stage,
(c) a play and
(d) content of a play, wherein a play comprises content, a stage comprises a plurality of plays and a playbook comprises a plurality of stages.

18. The process of claim 17, wherein an action of a rules indicating selection of a playbook element to be displayed is one of: selection of content for a play, selection of a play, selection of a stage and selection of a playbook.

19. The process of claim 13, further comprising:
displaying, in the rules selection interface, for a selected displayed rule, playbook elements of playbooks which use the selected displayed rule.

20. The process of claim 13, further comprising:
displaying, in the rules selection interface, for each rule of the displayed rules, a type of object from the customer relationship management system used by the rule and a description of the rule.

21. The process of claim 13, further comprising:
displaying, in the playbook manager, a user interface object for each item of content associated with a playbook element, and
in response to user input with respect to the user interface object for an item of content, activating the rules selection interface with respect to the item of content to associate a rule with the item of content.

* * * * *